United States Patent [19]
Fukui et al.

[11] Patent Number: 5,672,005
[45] Date of Patent: Sep. 30, 1997

[54] KNEADER

[75] Inventors: Tsugushi Fukui; Kimio Inoue; Yoshinori Kuroda; Hiroshi Ueda; Masahiko Kashiwa, all of Takasago, Japan

[73] Assignee: Kabushiki Kaisha Kobeseikosho, Kobe, Japan

[21] Appl. No.: 549,762

[22] PCT Filed: Apr. 18, 1995

[86] PCT No.: PCT/JP95/00751

§ 371 Date: Nov. 30, 1995

§ 102(e) Date: Nov. 30, 1995

[87] PCT Pub. No.: WO95/28224

PCT Pub. Date: Oct. 26, 1995

[30] Foreign Application Priority Data

Apr. 18, 1994 [JP] Japan .................. 6-079050
Apr. 17, 1995 [JP] Japan .................. 7-091019

[51] Int. Cl.⁶ .......................... B29B 7/38; B01F 7/08
[52] U.S. Cl. ................... 366/75; 366/79; 366/80; 366/82
[58] Field of Search .................. 366/75, 79, 80, 366/81, 82, 88, 89, 90, 97, 302, 307, 318, 322, 323

[56] References Cited

U.S. PATENT DOCUMENTS

| | | | |
|---|---|---|---|
| 2,765,490 | 10/1956 | Zona | 366/88 |
| 3,667,733 | 6/1972 | Fritsch | 366/81 |
| 4,131,368 | 12/1978 | Iddon | 366/81 |
| 4,431,311 | 2/1984 | Kolossow | 366/79 |
| 4,519,712 | 5/1985 | Barr | 366/88 |
| 4,542,992 | 9/1985 | Markhart | 366/84 |
| 4,558,954 | 12/1985 | Barr | 366/90 |
| 4,746,220 | 5/1988 | Sukai et al. | 366/79 |

FOREIGN PATENT DOCUMENTS

| | | |
|---|---|---|
| 46305 | 11/1980 | Japan . |
| 58-50533 | 11/1983 | Japan . |
| 3251405 | 11/1991 | Japan . |
| 28505 | 1/1992 | Japan . |
| 4161238 | 6/1992 | Japan . |
| 842692 | 7/1960 | United Kingdom ........ 366/80 |

*Primary Examiner*—Tony G. Soohoo
*Attorney, Agent, or Firm*—Oblon, Spivak, McClelland, Maier & Neustadt, P.C.

[57] ABSTRACT

A kneader with a vent function, including a kneading extruder, which permits the continuous viscous flow of material to be kneaded even at a high speed rotation to prevent the generation of cuttings and exhibiting sufficient venting capability. The kneader includes a barrel having kneading chambers defined therein, a rotor rotatably inserted into the kneading chambers, and having a feed portion on an outer peripheral surface thereof. A vent port is in communication with the kneading chamber of the barrel at a position around the feed portion. The feed portion in a vent zone includes a screw tip having a material feed surface with an outwardly curved surface in section.

20 Claims, 11 Drawing Sheets

KNEADER

BACKGROUND OF THE INVENTION

1. Field of the Invention

The present invention relates to kneaders (including kneading extruders) with vent function which are adapted to plasticize and homogeneously knead material containing rubber or resin and, admixed therewith, additives such as pigment and reinforcing materials such as glass fiber, and more particularly, to the rotor configuration of such kneaders.

2. Discussion of the Background

Known kneaders of this type include one illustrated in FIGS. 12 to 15 (refer to Japanese Unexamined Patent Publication No. HEI 4-28505).

In FIG. 12, the kneader 1 includes an elongated barrel (casing) 2 laid on a base 8 through support legs 9, the barrel 2 having at one axial end thereof a supply inlet 13 for material to be kneaded (rubber, resin or the like) and at the other axial end thereof a discharge outlet 15 kneading chambers 6 and 7 axially extending from the supply inlet 13 to the discharge outlet 15 and a rotor inserted into the kneading chambers 6 and 7 which is rotatable about the axis by rotor drive means 4.

A gating device 5 is provided intermediate the axis of the barrel 2, and a dam portion 12 in the form of ring, corresponding to the gating device 5, is provided to the rotor 3 and divides the kneading chamber in terms of the axis into first kneading chamber (first kneading stage) 6 and second stage kneading chamber (second kneading stage) 7. A vent port 14 communicating with the second stage kneading chamber 7 is formed in the barrel 2 at a location adjacent the gating device 5.

The kneading chambers 6 and 7 are shaped like eyeglasses in cross section, each eyeglass portion radially communicating with the other. A pair of rotors 3 are inserted into respective eyeglass portions and adapted to rotate inward with respect to each other as indicated by arrows in FIG. 15.

The pair of rotors 3 each has, on the periphery thereof along the axis, a feed portion 10A comprising screw tip 19 and a kneading portion 11A comprising kneading wing within the first kneading chamber 6, and a feed portion 10B comprising screw tip 19 and a kneading portion 11B comprising kneading wing within the second kneading chamber 7.

The feed portion 10A within the first stage kneading chamber 6 is adapted to plasticize and transport the material to be kneaded which is introduced through the supply inlet 13, while the feed portion 10B within the second stage kneading chamber 7 is adapted to transport the material in melted state.

The gating device 5 includes a pair of upper and lower gating members 16 and 17 fittedly inserted into corresponding slide guide portions 16A and 17A formed in upper and lower portions of the barrel 2 for movement toward and away from the dam portion 12. The gating members 16 and 17 respectively have gating portions 16B and 17B in tapered configuration as shown in FIG. 13, so as to be capable of regulating resin channel 21 by way of drive means 18.

As shown in FIG. 9, the first kneading portion 11A and second feed portion 10B of the rotor 3 inserted in the kneading chambers 6 and 7 of the same diameter D have substantially the same outer diameter, while the dam portion 12 situated between these portions is smaller than them in outer diameter, whereby impulsive spaces S1, S2 and S3 are transversely defined between right and left dam portions 12,12 and between the dam portion 12 and the internal surface of the barrel 2 as shown in FIG. 15. The screw tip 19 of the feed portion 10B, when viewed in section in FIG. 14, has a material feed surface 19B on one side thereof and a material feed back surface 19C on the other side which are both flat and upright and extend from inwardly rounded surfaces 20 formed in the base portion of the tip. Thus, when the rotor 3 is rotated, the material to be kneaded is fed (or pushed forward) by the material feed surface 19B.

To prevent short pass conventionally, the art described in Japanese Unexamined Patent Publication No. HEI 4-28505 allows the upper and lower gating members 16 and 17 to shut the impulsive spaces S1, S2 and S3 as shown in FIG. 15, thereby defining complete double cylinder. This art, however, involves a drawback that resin fed from the resin channel 21 to a venting section is vented up to clog the vent port 14.

To prevent this vent-up and minimize the powdering of the material, a known art provides a pair of right and left kneading chambers which are disposed on different levels, and a vent having an lower end which opens only in the kneading chamber on the upper level (see Japanese Unexamined Patent Publication No. HEI 3-251405).

To enhance the material feed capability, the minimum clearance HO between the screw tip 19 and the internal surface of the kneading chamber 7 of the barrel 2 is made as small as possible within such a range as not to cause metallic contact, for example, 0.01 to 0.02 times the inner diameter of the kneading chamber (which is usually referred to as barrel bore) or smaller, and the helical angle θ is about 20°.

Since the material undergoing kneading which is passed through the dam portion 12 and fed toward the vent port 14 is in melted state and, in addition, each rotor 3 rotates at a high speed, the above prior art involves a problem that the flat and upright material feed surface 19B of the screw tip 19, which acts like a knife, cuts the material to generate cuttings, which in turn stick to the periphery of the vent port 14 to clog the vent eventually thereby deteriorating the vent capability. This phenomenon becomes more acute with a higher viscosity material.

This is because the melted resin coming out of the resin channel 21 in the form of thin film, which is a high viscosity material, will not readily turn into a viscous flow on the material feed surface 19B of the screw.

It should be noted that the latter prior art permits continuous viscous flow of the material undergoing kneading and hence prevents the generation of cuttings when the rotor 3 rotates at a low speed (200 rpm or lower) and where the material is a low viscosity material, but cannot prevent the generation of cuttings when the rotor rotates at a high speed.

Further, since the material feed back surface 19C of the screw tip 19 is flat and upright, the amount of resin flowing round along screw groove 19D and fed back is large, resulting in poor efficiency.

The present invention has been attained in view of the foregoing situation, and it is therefore an object of the present invention to provide a kneader which permits continuous viscous flow of material to be kneaded even at a high speed rotation so as to prevent the generation of cuttings and hence exhibits sufficient venting capability.

DISCLOSURE OF THE INVENTION

The present invention provides the following technical means in a kneader including a barrel having an axially extending kneading chamber and a vent port in communication with the kneading chamber, and a rotor rotatably inserted into the kneading chamber and having a feed portion comprising a screw tip on an outer peripheral surface thereof, the feed portion of the rotor being positioned in a vent zone including the vent port.

Specifically, a first aspect of the present invention is characterized in that the screw tip of the feed portion in the vent zone has a material feed surface comprising an outwardly curved surface in section.

A second aspect of the present invention is characterized in that the screw tip of the feed portion in the vent zone has a material feed surface and a material feed back surface both comprising respective outwardly curved surfaces in section.

In the present invention it is possible to provide a gating device to the barrel at an axially intermediate location and a dam portion to the rotor at a location corresponding to the gating device thereby dividing the kneading chamber into a first stage kneading chamber and a second stage kneading chamber, the second chamber being in communication with the vent port.

The minimum clearance between the feed portion and the inner surface of the kneading chamber may be 0.03 to 0.08 times the inner diameter of the kneading chamber, and the outwardly curved surface of the material feed surface may have a smaller curvature radius than that of the material feed back surface.

Furthermore, the screw tip of the feed portion in the vent zone may be formed in tapered configuration having a diameter which grows greater as it advances in the material feed direction, and the screw tip of the feed portion may have a helical angle of 15° to 60°.

According to the present invention, since the material feed surface 19B comprises an outwardly curved surface in section, a melted and homogenized material fed from a resin channel 21 defined between the dam portion 12 and gating members 16 and 17 is ground between the screw tip and the inner surface of the barrel 2 and carried as a continuous viscous flow within the screw groove 19D without any break to the discharge outlet 15. As a result, the material is prevented from generating cuttings scattering around thereby assuring a continuous kneading operation without clogging the vent port 14. This allows volatile contents, such as water, contained in the material to be removed through the vent port 14 thereby improving the quality of kneaded materials.

Even if the melted resin coming out of the resin channel 21 in the form of thin film is a highly viscous material, the material feed surface 19B of screw comprising an outwardly curved surface in section readily turns the film into a viscous flow thereon, thus preventing the film from clogging the vent port 14. Furthermore, since the minimum clearance (tip clearance) HO between the feed portion 10B and the inner surface of the kneading chamber 7 is 0.03 to 0.08 times the inner diameter D of the kneading chamber, a high speed rotation of rotor 3 will not deteriorate the material feed capability thereby ensuring a desired amount of production.

Since the helical angle θ of screw tip 19 of the feed portion 10B is 15° to 60°, the material to be kneaded is transported at a proper speed to enhance the vent-up preventive capability.

According to another aspect of the present invention, both the material feed surface 19B and the material feed back surface 19C comprise respective outwardly curved surfaces in section, so that the amount of resin which passes the tip clearance while flowing round in the screw groove 19D can be increased thereby reducing the scattering and vent-up of melted resin.

An increase in the amount of the resin which passes along the tip portion ensures complete grinding of the melted resin thereby improving the quality of the kneaded material (elimination of gel).

In particular, the outwardly curved material feed back surface 19C presses the material against the inner surface of the barrel thereby further facilitating the gel elimination.

DESCRIPTION OF THE PREFERRED EMBODIMENTS

The present invention will now be described by way of embodiments thereof with reference to the drawings.

Figure 1:
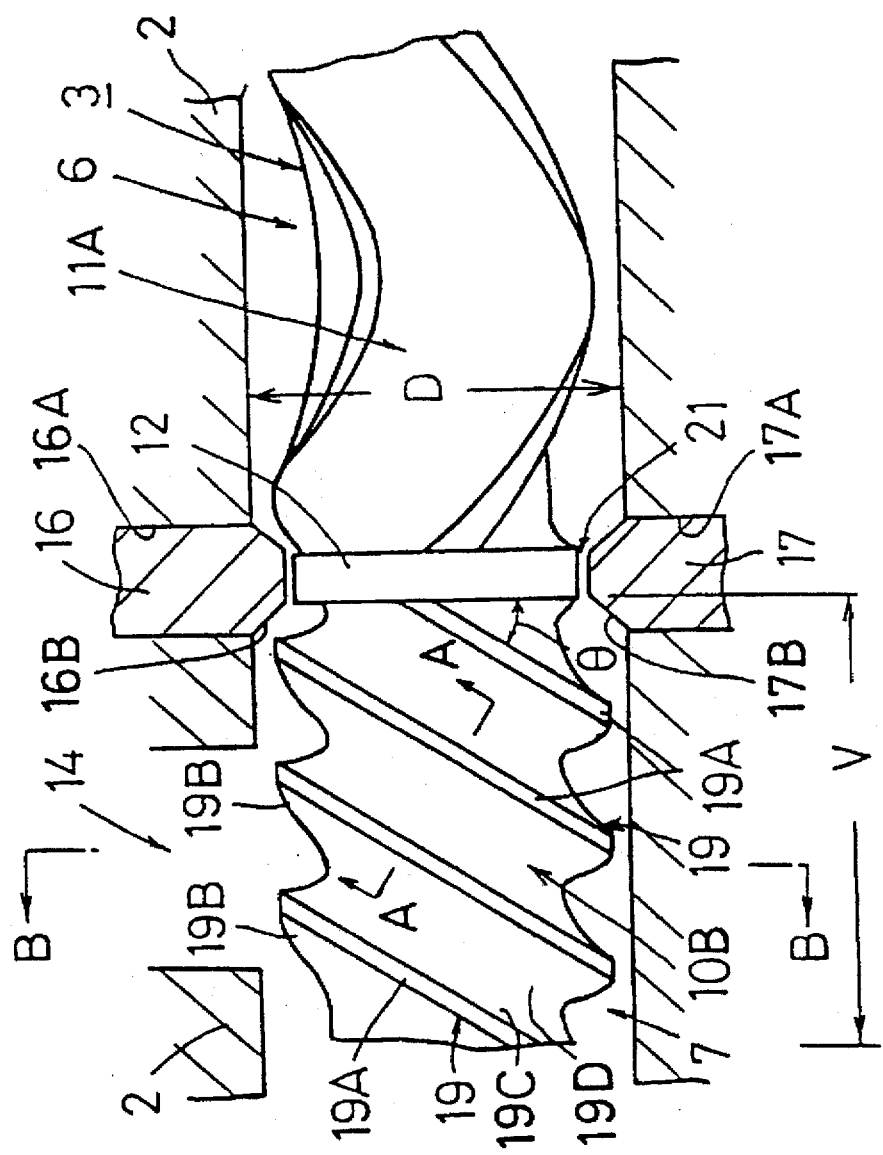
FIG. 1 is a partially cutaway side view showing a principal part of a first embodiment of the present invention.
Figure 2:
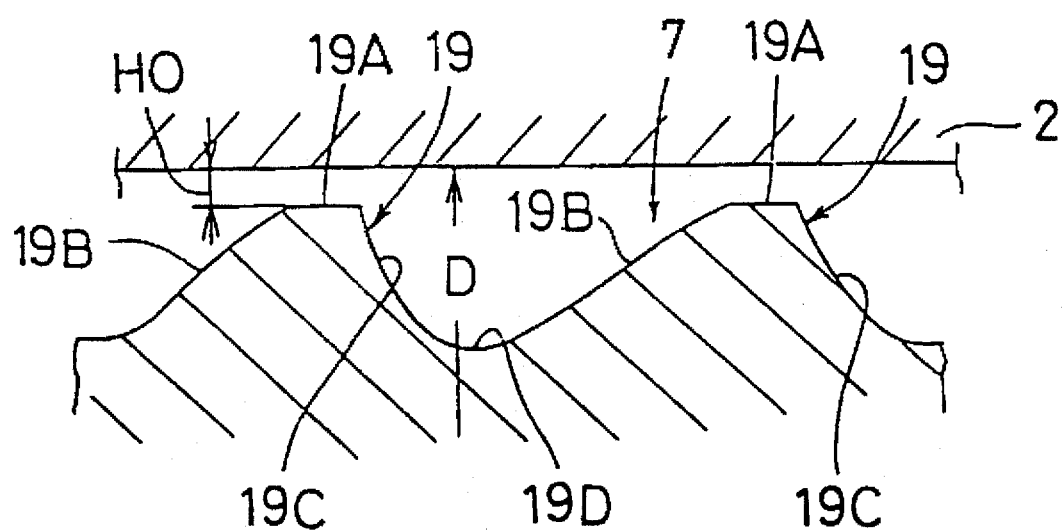
FIG. 2 is a sectional view taken along the line A—A of FIG. 1.
Figure 3:
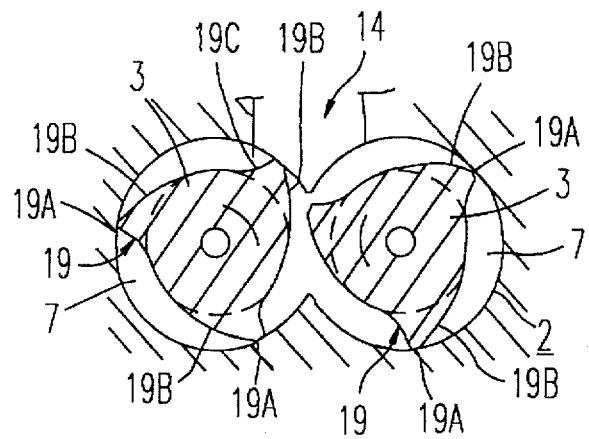
FIG. 3 is a sectional view taken along the line B—B of FIG. 1.
Figure 12:
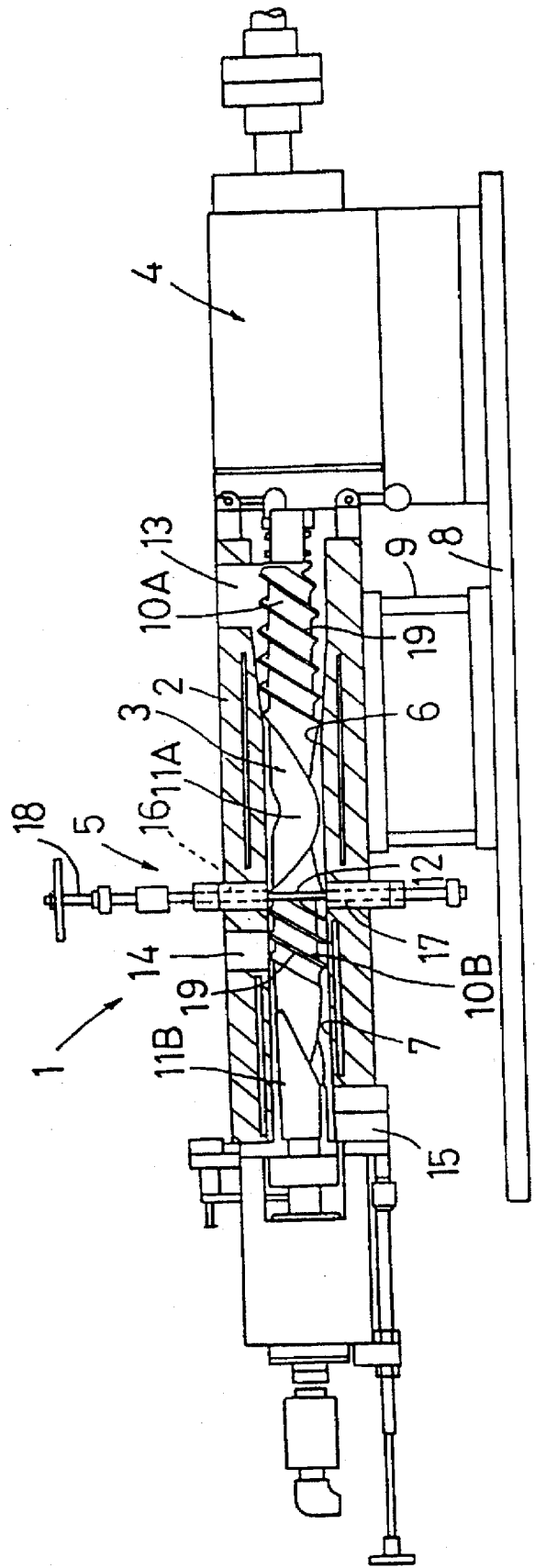
FIG. 12 is a partially cutaway overall side view showing a conventional kneader.
Figure 13:
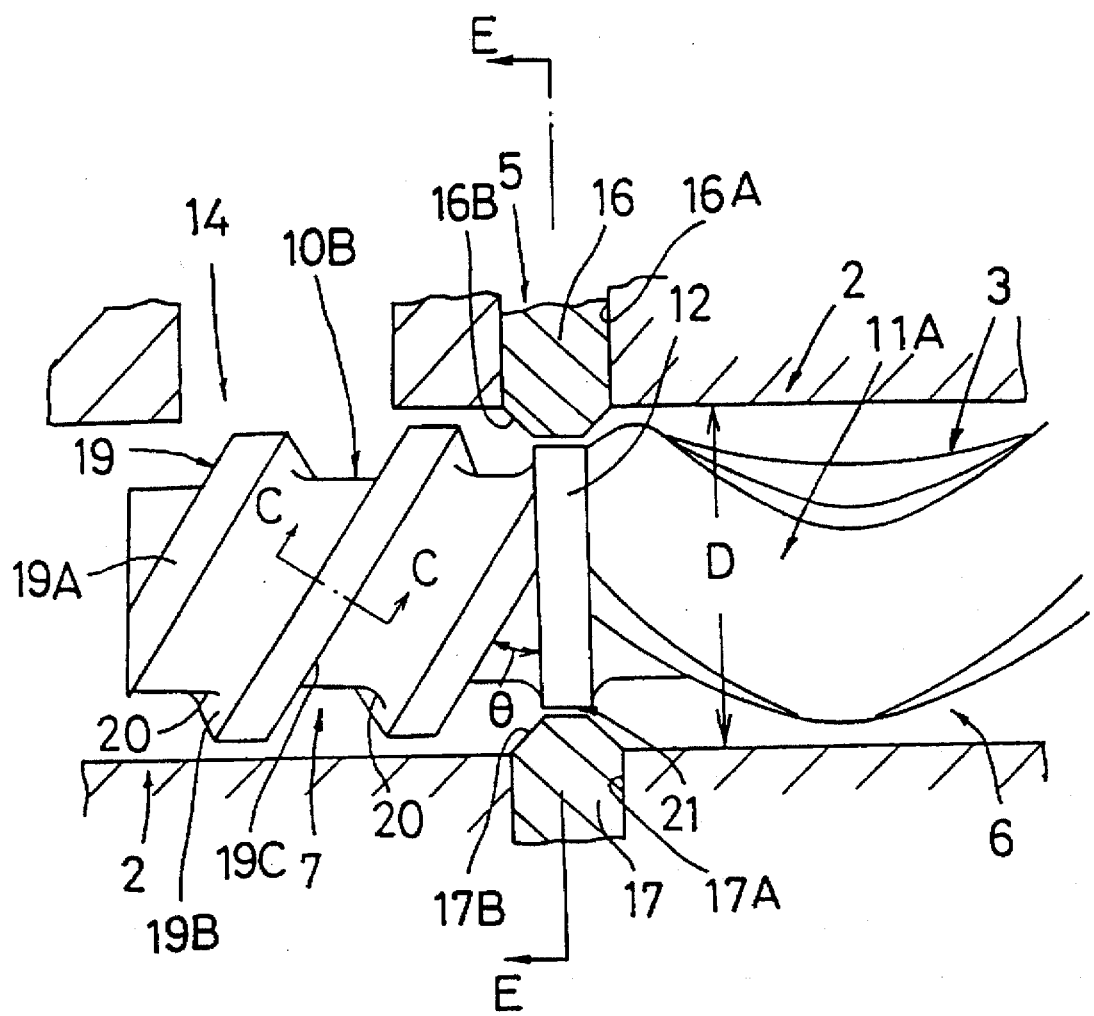
FIG. 13 is a partially cutaway side view showing a principal part of the conventional kneader.
Figure 14:
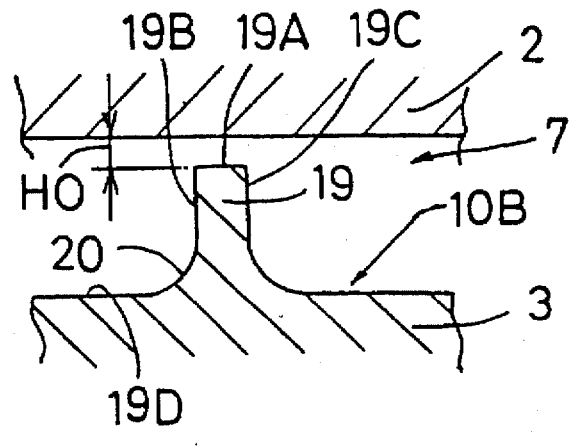
FIG. 14 is a sectional view taken along the line C—C of FIG. 13.
Figure 15:
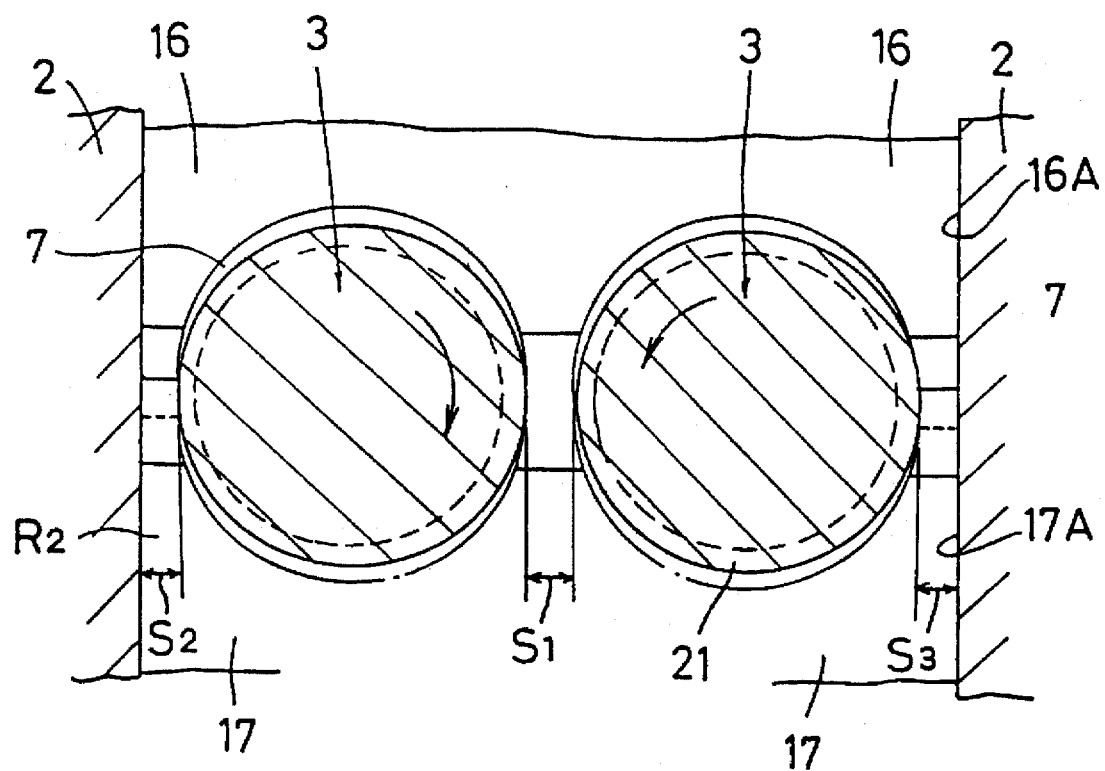
FIG. 15 is a sectional view taken along the line E—E of FIG. 13.

FIGS. 1 to 3 show a principal part of a first embodiment of the present invention. Since the first embodiment has the same basic structure as the conventional kneader having been described referring to FIG. 12, common portions are designated by the same reference numbers, and the characterizing portions of the present invention will be described in detail.

Materials to be kneaded by the kneader of the present invention are rubbers, plastics and the like, which may be admixed with additives such as pigment or reinforcing materials such as glass fiber.

The first embodiment comprises a pair of right and left rotors 3 which are rotatably inserted into first and second kneading chambers 6 and 7 defined in a barrel 2, the rotors 3 having, on the periphery thereof, feed portions 10A and 10B and kneading portions 11A and 11B axially separated by a dam portion 12 having a cylindrical surface with a reduced diameter, the feed portions and the kneading portions having substantially the same outer diameter, the feed portions each comprising a screw tip 19 having a helical angle of 30°.

The barrel 2 defines a vent port 14 extending to the second kneading chamber 7 on the upper side of the second kneading chamber and adjacent the dam portion 12. The barrel 2 is provided with a pair of upper and lower gating members 16 and 17 at locations corresponding to the outer periphery of the dam portion 12. The gating members 16 and 17 are movable toward and away from the dam portion 12 so that a channel 21 defined by the clearance around the outer periphery of the dam portion 12 is freely adjusted.

The screw tip 19 of the feed portion 10B in the second kneading chamber 7, at least within a vent zone V, includes a material feed surface 19B comprising a gently outwardly curved surface in section (the center of the curvature thereof is located inside the rotor 3 or the material feed surface 19B) and a material feed back surface 19C being flat and upright. The minimum clearance HO (tip clearance) between a screw tip flight 19A and the inner diameter D of the barrel 2 is 0.03 to 0.08 times the inner diameter D of the barrel 2, so that the material undergoing kneading is ground by the outwardly curved material feed surface 19B and permitted to turn into a continuous viscous flow streaming in the screw groove 19D without any break.

Preferably, the helical angle θ is 15° to 60°. When the helical angle θ is less than 15°, the material stays in the vent zone for longer time, resulting in an excessive increase in the amount of the material in the vent zone, though the vent-up ratio (amount of vent-up/amount of production) is reduced. When the helical angle θ is greater than 60°, the feeding speed of the material along the screw tip 19 is lowered. This increases the vent-up ratio, that is, the material is readily vented up.

As described above, the ideal minimum clearance HO is 0.03 D to 0.08 D. When the clearance HO is less than 0.03 D, the vent-up ratio is increased because the cutting function of the flight 19A of the screw tip is enhanced to increase cuttings of the material. When the HO is greater than 0.08 D, the material feeding function of the screw tip 19 is extremely degraded.

As a result, the value θ is desirably set to 15° or 30° when the value HO is 0.03 D, and to 30° when the value HO is 0.04 D.

Figure 4:
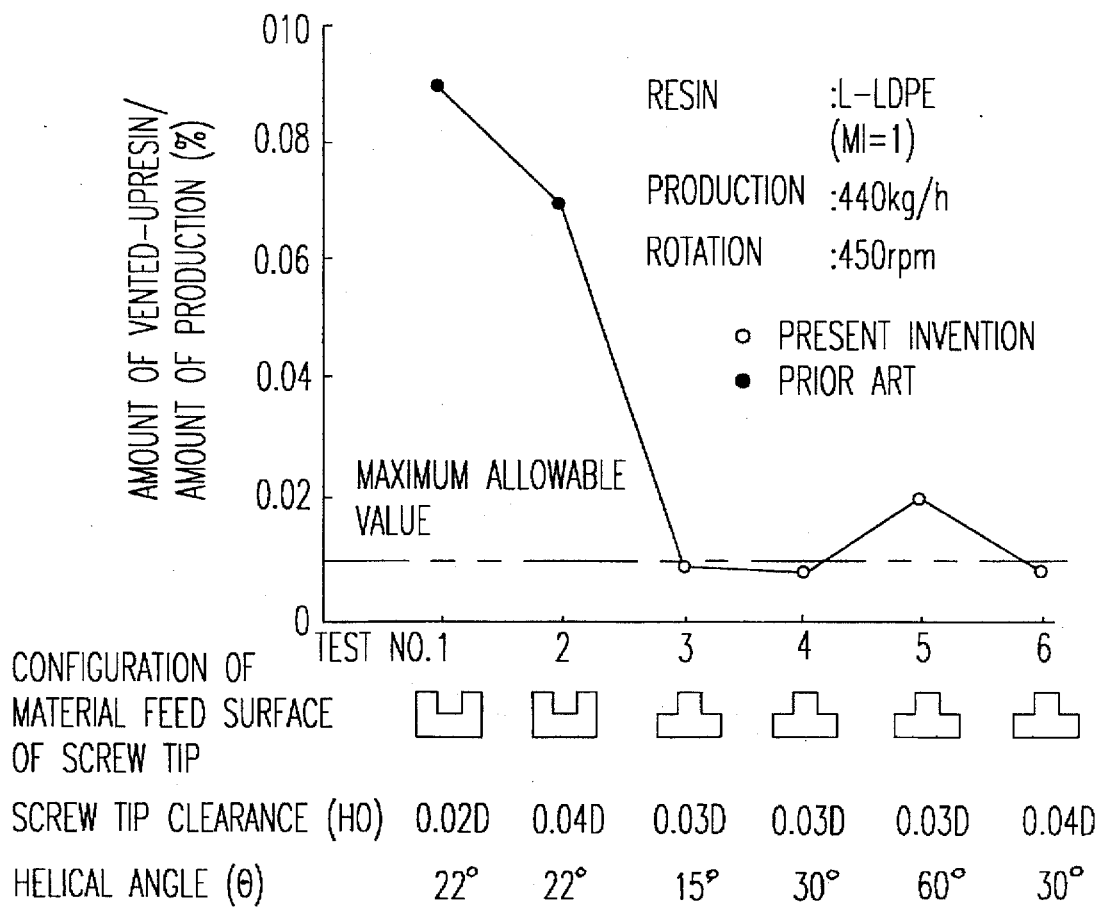
FIG. 4 is a graph showing the results of vent-up ratio test on an embodiment of the present invention and a conventional kneader.

The advantages of the first embodiment of the present invention are apparent from the test results for comparison with the conventional kneaders as shown in FIG. 4. The graph in FIG. 4 shows the ratio of the amount of vented-up resin to the amount of production, i.e., the vent-up ratio (%) of each of the conventional kneader (Test Nos. 1 and 2) and the first embodiment of the present invention (Test Nos. 3, 4, 5 and 6). The tests were conducted under the conditions: test material=linear low-density polyethylene (LLDPE); number of revolutions of rotors=450 rpm; and production rate=440 kg/h.

As obvious from FIG. 4, the vent-up ratio of the conventional kneader was 0.07% or greater, while the vent-up ratio of the embodiment of the present invention was 0.02% or less and the vent-up ratios in the Tests Nos. 3, 4, and 6, except No. 5 were not greater than 0.01%, i.e., not greater than the maximum allowable value.

Figure 5:
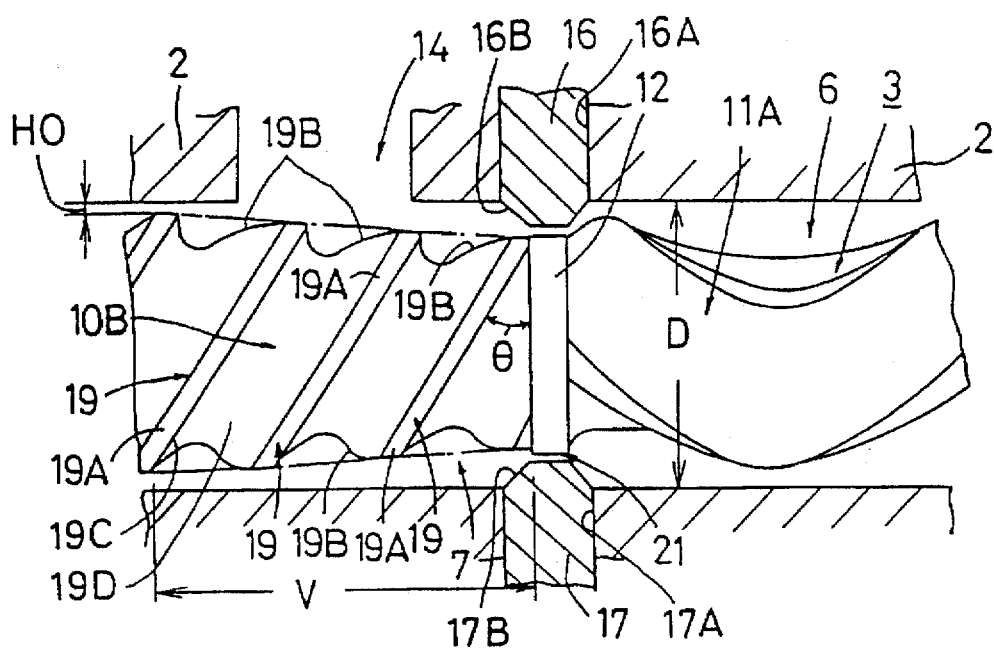
FIG. 5 is a partially cutaway side view showing a principal part of a second embodiment of the present invention.

FIG. 5 shows a second embodiment of the present invention which differs from the first invention in that screw tip 19 of feed portion 10B within vent zone V of second chamber 7 is formed in a tapered configuration growing greater in outer diameter as it approaching the discharge outlet side (in the material feed direction). This arrangement prevents the material from generating excessive heat. It should be noted that other constituents of the second embodiment are expected to function in the same way as the corresponding constituents of the first embodiment and hence are respectively designated by the same numbers as those used for the first embodiment to omit the description of such constituents.

Figure 6:
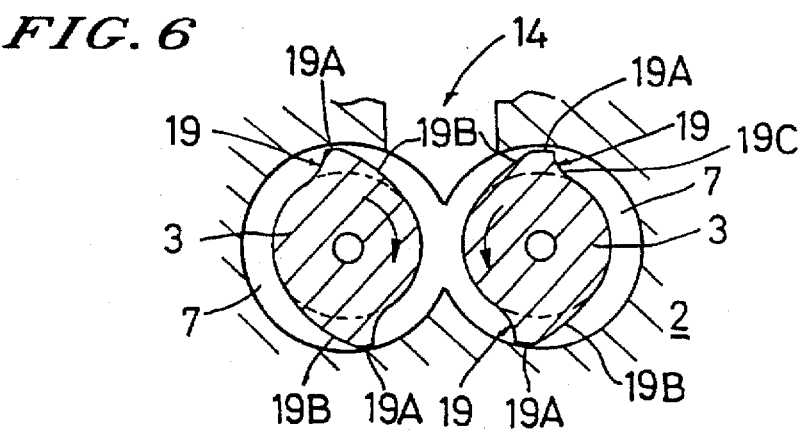
FIG. 6 is a sectional view showing an embodiment of the present invention comprising double screw tips.
Figure 7:
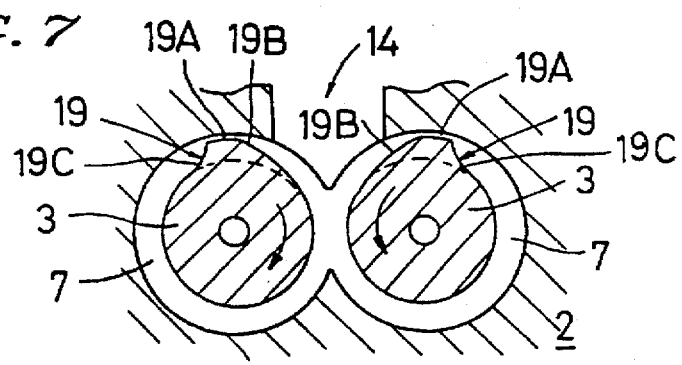
FIG. 7 is a sectional view showing an embodiment of the present invention comprising a single screw tip.
Figure 8:
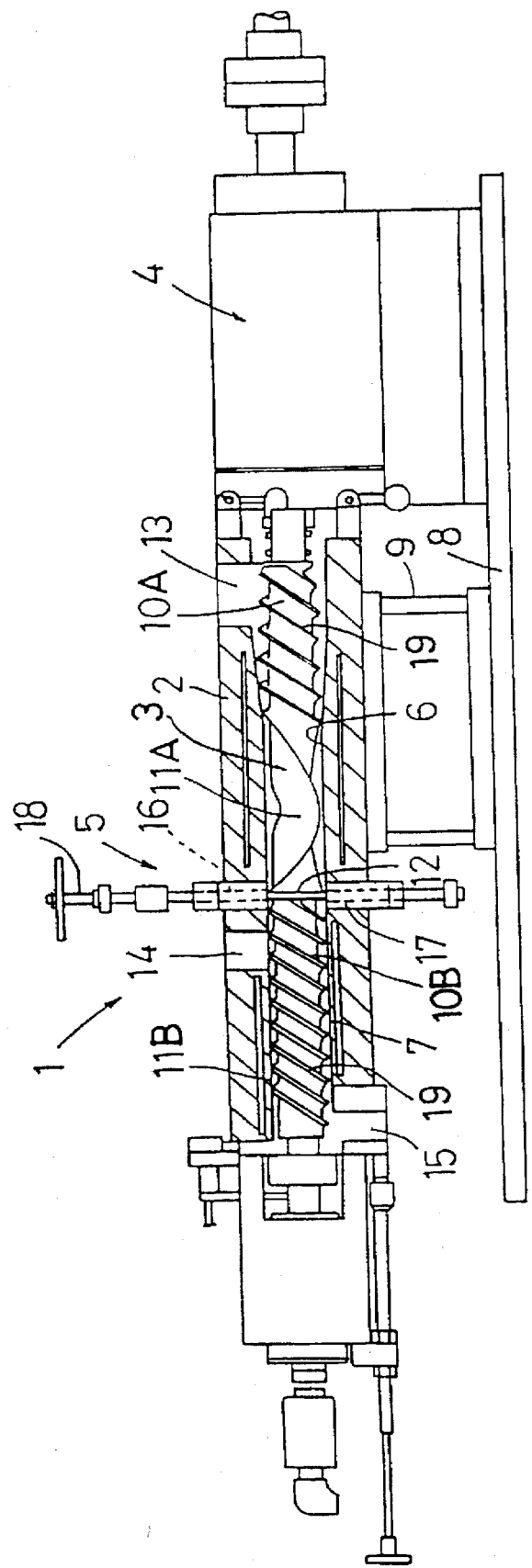
FIG. 8 is a partially cutaway overall side view showing a schematic structure of a continuous double-rotor kneader.

The foregoing embodiments are not limitative of the invention, and may be subjected to any changes. For example, the rotor with a single screw tip 19 as shown in FIG. 7 as well as the rotor with double screw tips 19 as shown in FIG. 6 may be employed in the present invention. Further, the kneading portion 11B in the second kneading chamber 7 may be formed into a different configuration from the kneading portion 11A in the first kneading chamber 6. For example, the kneading portion 11B in the second kneading chamber 7 may have extended screw tip 19 as shown in FIG. 8. The embodiments of the present invention may be modified in design as a double-rotor kneader (including a double-rotor kneading extruder) or a single-rotor kneader (including a single-rotor kneading extruder).

In the double-rotor kneader, the rotors have engagement portions at their screws, and the rotors may be variously designed such that the rotors rotate in a circumferential direction or in the opposite directions or such that they rotate with complete engagement, with partial engagement or without engagement.

Figure 9:
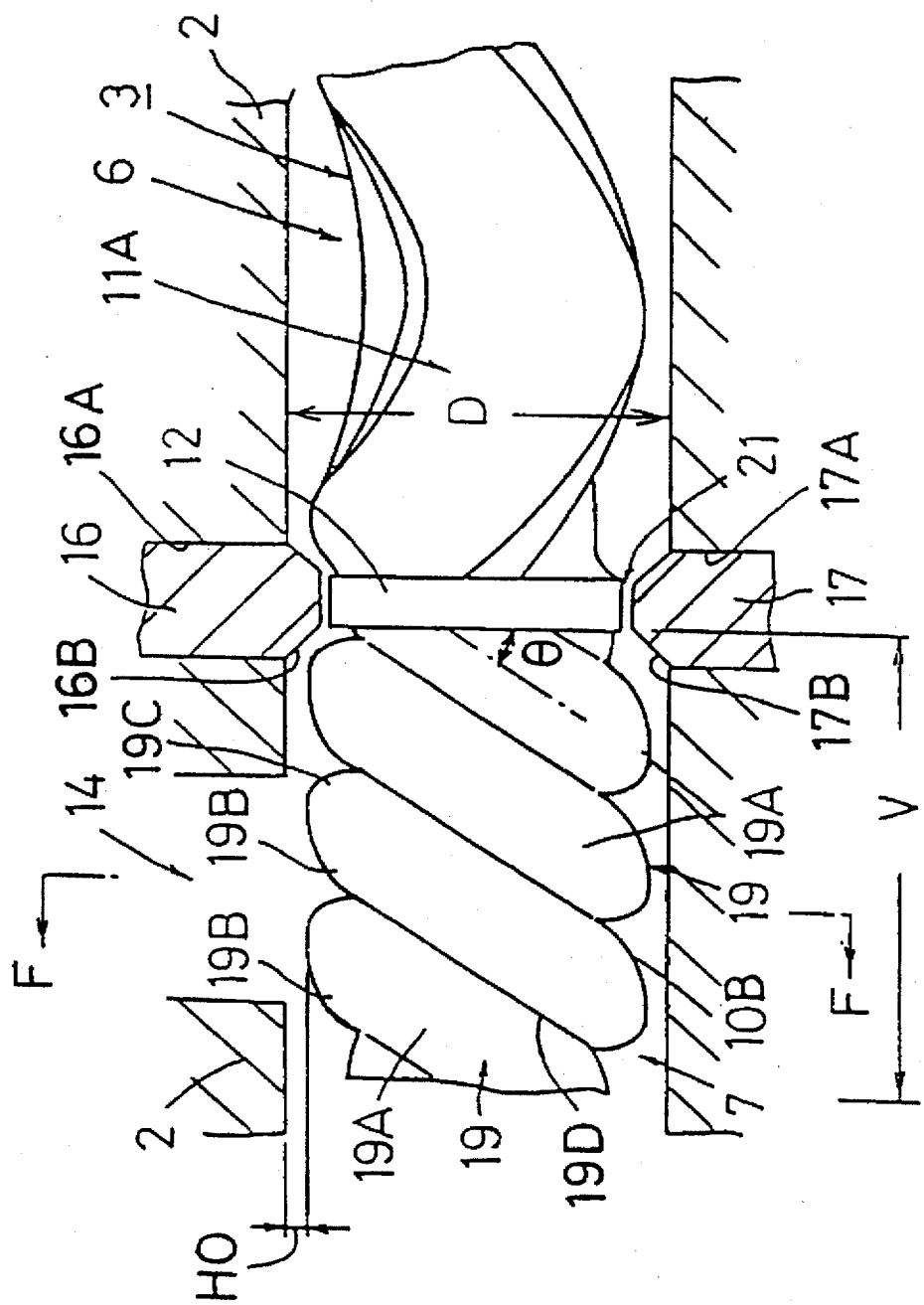
FIG. 9 is partially cutaway side view showing a principal part of an embodiment according to claim 2 of the present invention.
Figure 10:
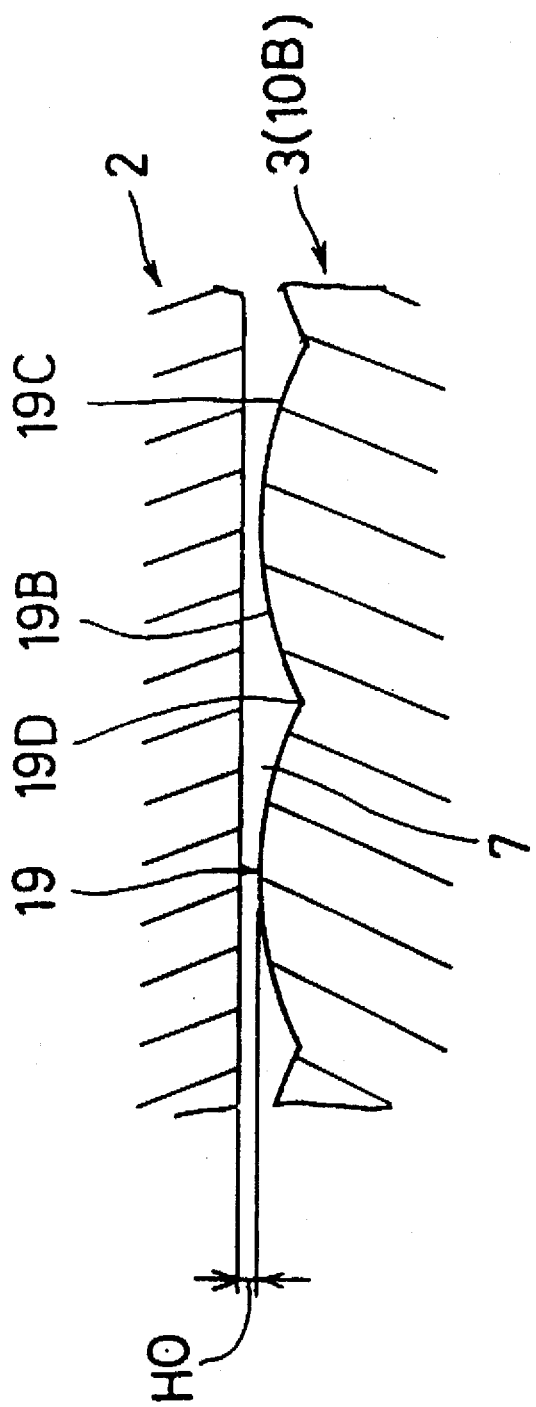
FIG. 10 is a longitudinal sectional view of FIG. 9.
Figure 11:
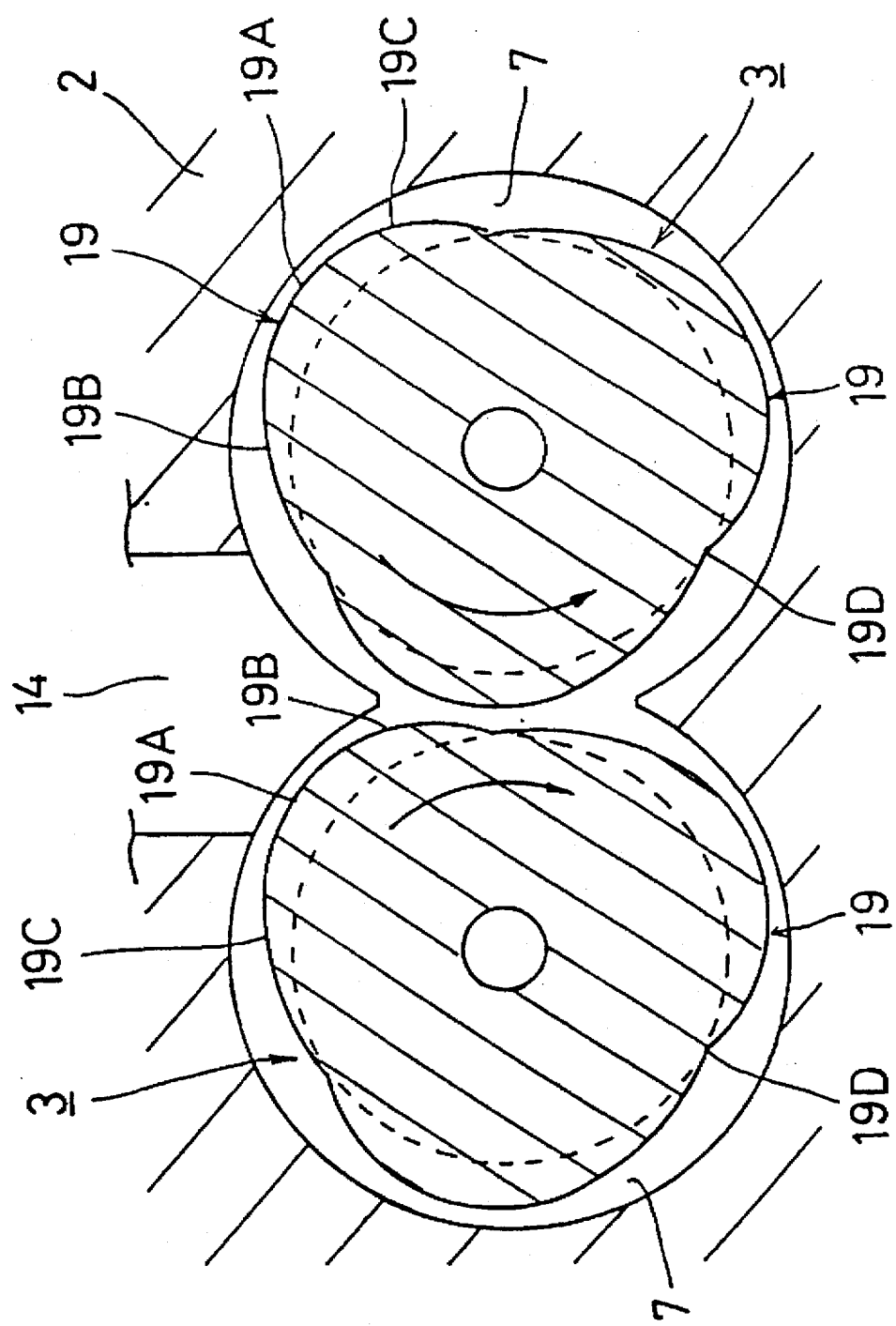
FIG. 11 is a cross sectional view taken along the line F—F of FIG. 9.

FIGS. 9 to 11 illustrates an embodiment according to claim 2 of the present invention wherein a screw tip 19 forming a feed portion 10B within a vent zone comprises a material feed surface (pushing surface) 19B and a feed back surface (pulling surface) 19C both of which comprise respective outwardly curved surfaces in section. Other constituents of this embodiment are common to the corresponding parts of the aforementioned embodiments and hence are designated by the same numbers as those used to designate the corresponding parts.

The material feed surface 19B and feed back surface 19C both comprise respective outwardly curved surfaces in section so that the amount of resin which passes through a tip clearance HO while flowing round in a screw groove 10D can be increased. This reduces the scattering of melted resin thereby restraining the vent-up of the resin.

Compared to the aforementioned first embodiment, the increase in the amount of resin passing through the tip clearance HO in this embodiment ensures finer grinding of melted resin between the screw tip and the inner surface of the barrel 2 to eliminate gel, resulting in improved kneading quality.

Specifically, the outwardly curved surface of the feed back surface 19C presses the material against the inner surface of the barrel at a location adjacent gating device 5 (outlet of channel 21) thereby further facilitating the elimination of gel.

Accordingly, while the curvature radiuses of the material feed surface 19B and the feed back surface 19C may be equal to each other, it is advantageous that the feed back surface 19C is formed to have a greater curvature radius than the feed surface 19B, in other words, the feed surface 19B is formed to have a smaller curvature radius than the feed back surface 19C.

Since the material feed surface 19B and the feed back surface 19C both comprise respective outwardly curved surfaces in section, the screw flight 19A substantially is a curved surface.

The kneader comprising double rotors with triple screw tips shown in FIGS. 9 to 11 may be modified into a kneader comprising rotors with single or double screw tips. This embodiment is applicable to a kneader comprising a single rotor and to the kneaders shown in FIG. 5 and 8.

While the screw tip comprising the outwardly curved material feed surface or comprising both the outwardly curved material feed surface and the outwardly curved material feed back surface is particularly advantageous in the second kneading stage, the screw tip in the first kneading stage may also comprise an outwardly curved surface in section.

With the first embodiment of the present invention, the material to be kneaded is possible to stream in a continuous viscous flow without any break. As a result, the generation of cuttings of the material and the clogging of the vent port are avoided, so that the kneader can continuously be operated and efficiently remove volatile contents, such as water, contained in the material through the vent port, thereby ensuring improved kneading quality.

With the second embodiment of the present invention, the material feed surface and the material feed back surface of the screw tip both comprising respective outwardly curved surfaces in section enhance the grinding function cooperatively with the inner surface of the barrel to eliminate gel, thereby contributing to a further improvement in kneading quality.

The present invention is applicable to kneaders with vent function which are adapted to plasticize and homogeneously knead material containing rubber or resin and admixed therewith additives such as pigment and reinforcing materials such as glass fiber.

What is claimed is:

1. An kneader comprising:

a barrel having an axially extending kneading chamber and a vent port in communication with said kneading chamber, and a rotor rotatably inserted into said kneading chamber, having a kneading portion and a feed portion having a shape different from that of said kneading portion, said feed portion being spaced from said kneading portion along the length of said rotor and having a screw tip on an outer peripheral surface thereof and being positioned in a vent zone including said vent port, wherein said screw tip of said feed portion in said vent zone has a material feed surface comprising an outwardly curved surface in axial section.

2. A kneader as set forth in claim 1, further comprising:

a gating device positioned at an axially intermediate location of said barrel; and a dam portion of said rotor positioned at a location corresponding to said gating device, the dam portion dividing said kneading chamber into a first stage kneading chamber and a second stage kneading chamber, the second chamber being in communication with said vent port.

3. A kneader as set forth in claim 2, including a clearance between said feed portion and the inner surface of said kneading chamber said clearance being 0.03 to 0.08 times the inner diameter of said kneading chamber.

4. A kneader as set forth in claim 2, wherein said screw tip of said feed portion in said vent zone is formed in tapered configuration growing greater in diameter as it advances in the material feed direction.

5. A kneader as set forth in claim 2, wherein said screw tip of said feed portion has a helical angle of 15° to 60°.

6. A kneader as set forth in claim 1, including a clearance between said feed portion and the inner surface of said kneading chamber, said clearance being at least 0.03 to 0.08 times the inner diameter of said kneading chamber.

7. A kneader as set forth in claim 6, wherein said screw tip of said feed portion in said vent zone is formed in a tapered configuration growing greater in diameter as it advances in the material feed direction.

8. A kneader as set forth in claim 6, wherein said screw tip of said feed portion has a helical angle of 15° to 60°.

9. A kneader as set forth in claim 1, wherein said screw tip of said feed portion in said vent zone is formed in a tapered configuration growing greater in diameter as it advances in the material feed direction.

10. A kneader as set forth in claim 9, wherein said screw tip of said feed portion has a helical angle of 15° to 60°.

11. A kneader as set forth in claim 1, wherein said screw tip of said feed portion has a helical angle of 15° to 60°.

12. A kneader comprising:

a barrel having an axially extending kneading chamber and a vent port in communication with said kneading chamber, and a rotor rotatably inserted into said kneading chamber, said rotor having a kneading portion and a feed portion, having a shape different from that of said kneading portion, said feed portion being spaced from said kneading portion along the length of said rotor and having a screw tip on an outer peripheral surface thereof and being positioned in a vent zone including said vent port, wherein said screw tip of said feed portion in said vent zone has a material feed surface and a material feed back surface, both comprising respective outwardly curved surfaces in axial section.

13. A kneader as set of forth in claim 12, wherein said outwardly curved surface of said material feed surface has a radius of curvature smaller than that of said outwardly curved surface of said material feed back surface.

14. A kneader as set forth in claim 13, wherein said screw tip of said feed portion in said vent zone is formed in a tapered configuration growing greater in diameter as it advances in the material feed direction.

15. A kneader as set forth in claim 13, wherein said screw tip of said feed portion has a helical angle of 15° to 60°.

16. A kneader as set forth in claim 12, further comprising:

a gate device positioned at an axially intermediate location of said barrel; and a dam portion of said rotor positioned at a location corresponding to said gating device, the dam portion dividing said kneading chamber into a first stage kneading chamber and a second stage kneading chamber, the second stage kneading chamber being in communication with said vent port.

17. A kneader as set forth in claim 16, including a clearance between said feed portion and the inner surface of said kneading chamber said clearance being 0.03 to 0.08 times the inner diameter of said kneading chamber.

18. A kneader as set forth in claim 12, including a clearance between said feed portion and the inner surface of said kneading chamber, said clearance being at least 0.03 to 0.08 times the inner diameter of said kneading chamber.

19. A kneader as set forth in claim 12, wherein said screw tip of said feed portion in said vent zone is formed in a tapered configuration growing greater in diameter as it advances in the material feed direction.

20. A kneader as set forth in claim 12, wherein said screw tip of said feed portion has a helical angle of 15° to 60°.

* * * * *